United States Patent [19]
Jensen et al.

[11] 3,936,761
[45] Feb. 3, 1976

[54] PLURAL CHANNEL FILTER
[75] Inventors: Garold K. Jensen, Alexandria, Va.; James E. McGeogh, Silver Spring, Md.
[73] Assignee: The United States of America as represented by the Secretary of the Navy, Washington, D.C.
[22] Filed: June 27, 1967
[21] Appl. No.: 649,795

[52] U.S. Cl. ............................ 328/167; 343/8
[51] Int. Cl.² .................. H04B 1/10; H04B 15/00
[58] Field of Search ........... 328/103, 163, 167, 137, 328/152; 333/70; 343/8

[56] References Cited
UNITED STATES PATENTS

| | | | |
|---|---|---|---|
| 1,550,684 | 8/1925 | Espenschied | 328/163 |
| 3,022,471 | 2/1962 | Mork | 328/152 |
| 3,112,452 | 11/1963 | Kirkpatrick | 328/167 |
| 3,370,292 | 2/1968 | Deerfield | 328/167 |
| 3,562,556 | 2/1971 | Barber et al. | 328/167 |

Primary Examiner—T. H. Tubbesing
Assistant Examiner—G. E. Montone
Attorney, Agent, or Firm—R. S. Sciascia; Arthur L. Branning; Kenneth Jacobs

[57] ABSTRACT

A signal processing arrangement which discriminates against large-amplitude interference signals and in favor of information signals. Incoming signals are separated into a plurality of contiguous frequency channels whose total frequency coverage is the frequency band of interest. The signals in the individual channels are then amplitude limited so that relatively narrow band interference signals are limited while a wide band desired signal is not. The desired signal is then spectrally compressed to obtain a high amplitude signal while the remaining interference signals are spread and rejected.

10 Claims, 4 Drawing Figures

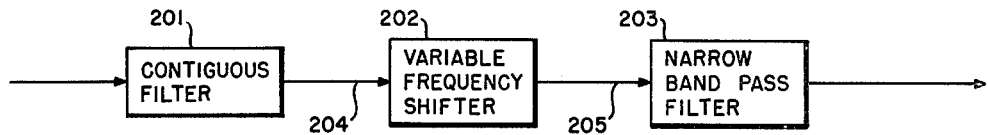
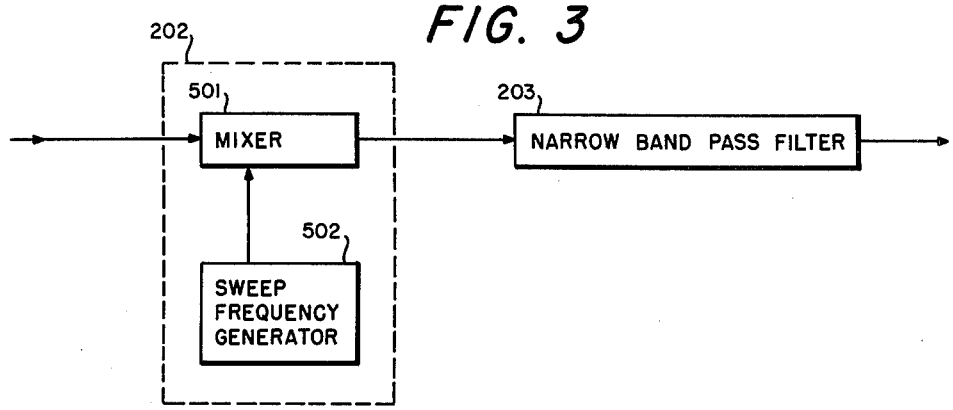
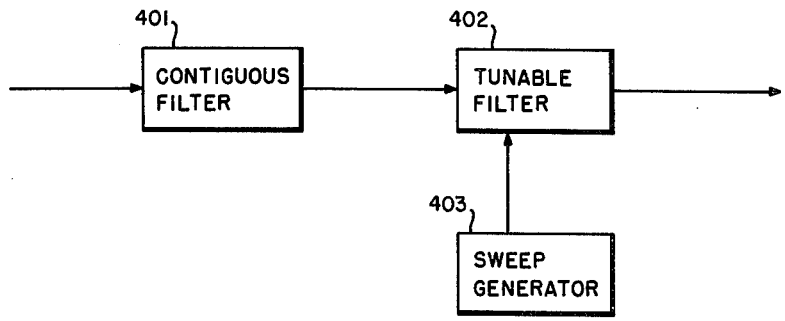

PLURAL CHANNEL FILTER

The invention described herein may be manufactured and used by or for the Government of the United States of America for governmental purposes without the payment of any royalties thereon or therefor.

BACKGROUND OF THE INVENTION

The invention relates to signal processing arrangements and particularly to arrangements for enhancing information signals with respect to interference.

In the electrical arts there exists a need for processing signals occurring in a background of noise or undesired signals. For example, in application Ser. No. 649,791 by Garold K. Jensen, filed concurrently herewith, there is disclosed a velocity and acceleration radar system designed to provide good doppler resolution for both constant-velocity and accelerating targets. That system detects accelerating targets by spectrally compressing the acceleration-spread doppler frequency spectrum, but the same frequency modulation that is employed to compress the spectrum of the return signal from an accelerating target produces frequency spreading of the signal energy from constant velocity targets. In such a case a large-amplitude signal from a constant velocity target will be detected and displayed over a wide band of doppler frequencies with nearly equal amplitudes so that an accurate doppler or velocity reading is not possible. Other smaller amplitude signals of interest may occur within the region of doppler spreading of the larger signal and these signals will then be masked by the larger spread signals.

Large-amplitude jamming signals are also spread in a similar manner and some arrangement is desirable to favor the information signals over the undesired jamming signals. Merely limiting the total incoming signal is not suitable because a very large signal can, in the limiting process, "capture" small signals existing anywhere in the whole information band. A more selective arrangement for discriminating against this interference is desired.

SUMMARY OF THE INVENTION

The general purpose of this invention is to provide a signal processing arrangement which embraces all the advantages of similarly employed devices and possesses none of the aforedescribed disadvantages.

Since the energy at any frequency in the spread spectrum is proportional to the total signal energy and approximately inversely proportional to the frequency spreading, it follows that if the total signal amplitude is limited there is also a limit upon the bandwidth over which the signal may be spread and still exceed the detectable level. Thus, if it is desired to distinguish between doppler returns from constant velocity targets and returns from accelerating targets it is advantageous to amplitude limit the signals at a point in the circuit where the undesired signal is concentrated in a narrow frequency band (or in frequency bands not occupied by the desired signal) and the desired signal is spread over a wide band. In this manner the undesired signal will be clipped in amplitude while the desired signal passes through without attenuation. To carry out this selective limiting a plurality of filters are used to separate the information frequency band into a plurality of relatively narrow frequency channels. Without this separation into frequency bands a very large signal could "capture" small signals existing anywhere in the whole information band by the limiting process, but by using plural filters the capture effect occurs in no more than one channel. In that single channel the large amplitude signal will be reduced to the limiting level and undesirable display effects will be eliminated. Signals in the remaining portions of the information frequency band will be unaffected and may be processed normally. When the interference occupies some of the filter channels occupied by the desired signal there is still some improvement obtained.

In order to avoid the introduction of undesired harmonics by the limiting process, appropriate filters are placed after the limiters to restrict each frequency channel to less than one octave.

Once the signals have been amplitude limited in the individual frequency channels, the outputs of the channels are vectorially added and the combined signal is subjected to a frequency shifting process which spectrally compresses a desired signal to confine its spectral energy to a very narrow spectral bandwidth with a resulting sizeable amplitude increase. The same process which spectrally compresses the desired signal also spectrally expands the undesired signals so that these signals may be rejected by a narrow pass filter.

The processing arrangement will be described with reference to a doppler radar system but it obviously has other uses.

An object of the present invention is the provision of an arrangement which prevents large amplitude signals from masking and causing the loss of small amplitude signals.

Another object of the present invention is the provision of an arrangement for passing signals whose power is spread over an extended frequency band while limiting signals whose power is confined to a narrow frequency band.

A further object of the present invention is the provision of an arrangement for discriminating between varying frequency signals and substantially constant frequency signals.

Another object of the invention is the provision of means to discriminate between doppler signals from accelerating and constant velocity targets.

Still another object is to provide means for discriminating between jamming signals and information signals.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 2 shows the contiguous filter of FIG. 1 being used in an arrangement for passing a signal whose frequency varies according to a unique pattern;

FIG. 3 shows a block diagram including one embodiment of the variable frequency shifter used in FIG. 2, and FIG. 4 shows another embodiment of the invention which may be used to pass a signal whose frequency varies according to a unique pattern.

DESCRIPTION OF THE PREFERRED EMBODIMENTS

Figure 1:
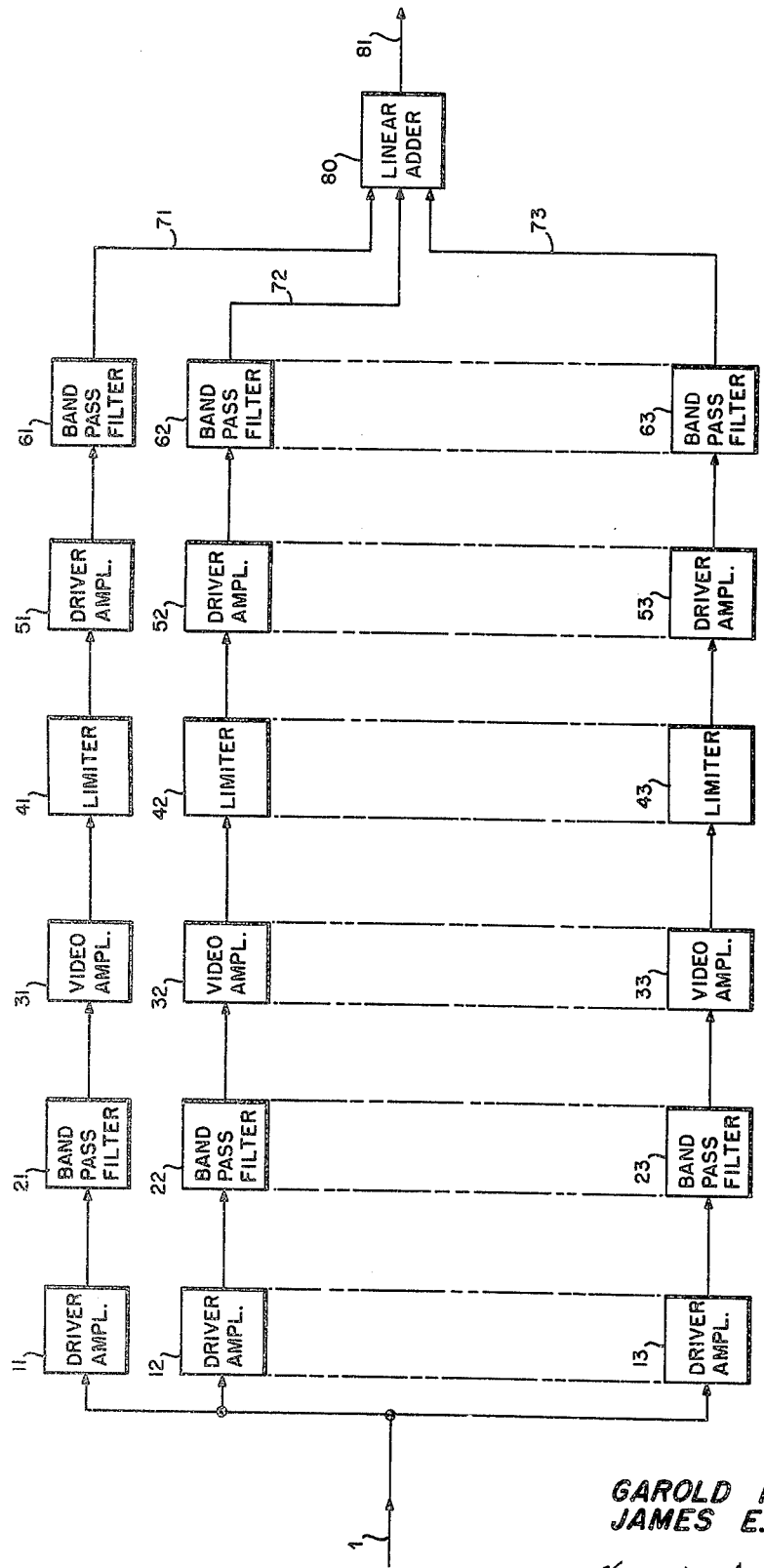
FIG. 1 shows a block diagram of a contiguous filter according to the present invention.

One particular contiguous filter according to the present invention is illustrated in FIG. 1 and is composed of a plurality of separate channels. The single input at 1 is distributed to all channels, each including a driver amplifier, a first band pass filter (BPF), a video amplifier, an amplitude limiter, an output driver amplifier, and a second band pass filter. The outputs of all channels are combined in adder stage 80.

Basically, the input BPF's of all channels are of equal bandwidths, with their passbands positioned immediately adjacent to one another in frequency and designed for a passband such that the composite total covers the entire input signal bandwidth. Each of the passbands covers less than a 2:1 frequency range so that any harmonic of individual channel input frequencies, introduced by the limiting action within a channel, will be attenuated by the channel output filter before recombination of the signals in adder 80.

By separating the information frequency span into a number of frequency bands before limiting, it is possible to avoid situations where the presence of a very large signal causes the loss of small signals, existing anywhere in the whole information band, by the limiting process. Before frequency separation, the signal to be limited would be the instantaneous sum of all signals present in the information band, and it can be seen that a single large amplitude signal can "capture" small signals which would merely appear as minor fluctuations on the dominant large signal. These minor fluctuations would be lost in the limiting process.

If ten channels are used in the contiguous filter this capture effect occurs in no more than one channel (only one-tenth the information band) even for a cw interfering signal. In that single channel the large amplitude signal will be reduced to the limiting level and its effect on other frequency signals present will be eliminated. Signals in the remaining nine-tenths of the doppler band will be unaffected and may be processed normally.

FIG. 2 shows a contiguous filter being used in an arrangement for the enhancing varying frequency signals having a given frequency vs. time relationship while discriminating against large-amplitude constant-frequency signals. Contiguous filter 201 may be similar to the arrangement shown in FIG. 1. It acts to separate the incoming signals into several frequency channels each less than an octave wide and then limits the amplitudes of the signals in the various channels. The outputs of the channels are vectorially added and appear on line 204. Variable frequency shifter 202 acts to shift the frequencies of the incoming signals by an amount which varies with time. If the arrangement is being used to detect doppler signals originating from an accelerating target, shifter 202 may act to continuously shift this varying doppler frequency by a varying amount so that the signals on line 205 resulting from an accelerating target is a constant frequency.

FIG. 3 shows how variable frequency shifter 202 may include a mixer 501 and a sweep frequency generator 502. If the generator signal varies in unison with the incoming doppler frequency the resulting difference frequency emitted by mixer 501 is constant. Narrow band pass filter 203 may be used to pass this desired frequency. A moving target radar system using this arrangement for analyzing varying frequency doppler signals is described in application Ser. No. 650,157 now U.S. Pat. No. 3,900,869 filed concurrently herewith by Garold K. Jensen. It will be noted that variable frequency shifter 202 would expand the frequency spectrum of constant frequency signals while compressing the spectrum of a varying frequency signals whose frequency sweep matches that of sweep frequency generator 502. In this way the undesired constant frequency signal would be expanded in frequency so that little of it passes through filter 203 while the desired varying frequency signal is collected in order to pass through this narrow filter. Contiguous filter 201 also aids the selectivity of the total circuit by limiting the constant frequency signal which is confined to one channel while not attenuating the varying frequency signal which is distributed among several channels.

FIG. 4 shows another embodiment of the invention wherein the variable frequency shifter and narrow pass filter of FIG. 3 are replaced by a tunable narrow band pass filter 402. The band pass of this filter may be made to vary its location in the frequency spectrum by the application of sweep signals from sweep generator 403. The use of such a tunable filter is disclosed in U.S. Pat. No. 3,307,182 issued on Feb. 28, 1967 to Christopher M. Morrow. The sweep generator could produce a variable voltage, such as a sawtooth waveform, which would be used to vary the center frequency of the tunable filter.

In conclusion, therefore, there has been disclosed arrangements for enhancing the signal-to-noise ratio of information signals accompanied by various types of undesired signals. Obviously many modifications and variations of the present invention are possible in light of the above teachings. It is therefore to be understood, that within the scope of the appended claims, the invention may be practiced otherwise than specifically described.

What is claimed and desired to be secured by letters patent of the United States is:

1. An arrangement for discriminating against narrow bandwidth signals and in favor of desired varying frequency signals wherein all of said signals occur in a predetermined frequency bandwidth, said arrangement comprising:

a plurality of channels having incremental bandwidths which are dimensioned in frequency to cover in their aggregate said predetermined bandwidth, said channels responsive to said signals to limit the amplitude of said signals to produce first signals;

means for vectorially adding said first signals to derive second signals and;

varying frequency means to receive said second signals and to produce output signals only when said second signals vary in frequency at a predetermined rate.

2. The arrangement of claim 1 wherein the bandwidths of the channels are each less than one octave.

3. The arrangement of claim 1 wherein the aggregate bandwidth of said plurality of channels is greater than one octave.

4. The arrangement of claim 1 wherein the varying frequency means includes a variable frequency generator to produce a local variable frequency signal.

5. The arrangement of claim 4 wherein the varying frequency means also includes a mixer means for receiving said second signals and said local signal to produce a difference frequency.

6. The arrangement of claim 5 wherein the varying frequency means also includes a narrow pass filter which receives said difference frequency and produces said output signals only when the difference frequency falls within the narrow pass of said filter.

7. The arrangement of claim 1 wherein the varying frequency means comprises a tunable band pass filter.

8. An arrangement for discriminating against narrow bandwidth signals and in favor of desired varying frequency signals, said arrangement comprising:
 a plurality of band pass channels connected in parallel to receive said signals; and
 varying frequency means to receive the combined outputs of said parallel channels to produce final output signals only when said combined outputs vary in frequency according to a predetermined pattern.

9. The arrangement of claim 8 wherein each said channel includes a band pass filter and an amplitude limiter connected in series.

10. The arrangement of claim 9 wherein each said channel includes another band pass filter connected in series after said amplitude limiter.

* * * * *